United States Patent [19]
Kivipelto

[11] Patent Number: 6,085,787
[45] Date of Patent: Jul. 11, 2000

[54] CONTROL VALVE

[75] Inventor: Pekka Kivipelto, Helsinki, Finland

[73] Assignee: Neles Controls OY, Helsinki, Finland

[21] Appl. No.: 09/142,505

[22] PCT Filed: Mar. 11, 1997

[86] PCT No.: PCT/FI97/00158

§ 371 Date: Apr. 21, 1999

§ 102(e) Date: Apr. 21, 1999

[87] PCT Pub. No.: WO97/34097

PCT Pub. Date: Sep. 18, 1997

[30] Foreign Application Priority Data

Mar. 11, 1996 [FI] Finland ..................................... 961125

[51] Int. Cl.$^7$ ..................................................... F16K 3/26
[52] U.S. Cl. .................................. 137/625.32; 137/625.3; 251/310
[58] Field of Search ............................ 137/625.3, 625.31, 137/625.32; 251/304, 309, 310, 314

[56] References Cited

U.S. PATENT DOCUMENTS

| | | | |
|---|---|---|---|
| 1,185,854 | 6/1916 | Stieglitz | 137/625.32 |
| 2,256,416 | 9/1941 | Stockstill | 251/310 |
| 2,371,657 | 3/1945 | Stark | 251/310 |
| 2,707,488 | 5/1955 | Overdijk | 251/304 |
| 3,937,591 | 2/1976 | Jantunen . | |
| 4,971,099 | 11/1990 | Cyvas . | |
| 5,246,035 | 9/1993 | Skyllingstad et al. | 137/625.32 |

FOREIGN PATENT DOCUMENTS

| | | |
|---|---|---|
| 0432873 | 6/1991 | European Pat. Off. . |
| 59154 | 2/1981 | Finland . |
| 68301 | 5/1984 | Finland . |
| 1951376 | 4/1971 | Germany . |
| 2054638 | 5/1972 | Germany . |
| 322384 | 7/1968 | Sweden . |
| 1313590 | 4/1973 | United Kingdom . |
| 1531474 | 2/1975 | United Kingdom . |

*Primary Examiner*—John Fox
*Attorney, Agent, or Firm*—Pillsbury Madison & Sutro LLP

[57] ABSTRACT

A control valve comprises a valve body (1) including two flow channels (2, 2'); a cup-formed, steplessly turnable closure member (5); and a shaft (6) for turning the closure member. On the sides of the closure member there is at least one opening (14). The second flow channel (2') has in the valve body (1) an extension (10), the outer surface of which forms a surface of revolution concentric with the inner surface of the closure member (5), and which extends within the closure member. On the sides of the flow channel extension there is at least one opening (21). The opening or openings (14) of the closure member are located so that in the open position of the valve they at least partly overlap the opening or openings (21) of the flow channel extension (10). In the closed position of the valve the openings of the flow channel are covered by the closure member.

18 Claims, 3 Drawing Sheets

CONTROL VALVE

This application is the national phase of international application PCT/FI97/00158 filed Mar. 11, 1997 which designated the U.S.

TECHNICAL FIELD

The present invention concerns a control valve comprising a valve body including a first and a second flow channel connected with each other;

a turnable, cup-formed closure member located within the valve body; and a shaft extending outside the valve body for turning the closure member;

whereby the inner surface of the closure member is a surface of revolution, the center axis of which is the turning shaft of the closure member, and on the sides of the closure member there is one or several openings which, in the open position of the valve, are connected with the flow channels of the valve body.

BACKGROUND ART

Linear regulating valves of seat-type are generally used. One of their disadvantages is the leakage of the packing between the valve body and the spindle that moves the closure member. The linear movement of the spindle "pumps" medium through the packing, but at the same time it also causes wear grooves to the packings, parallel with the movement. These wear grooves form for the medium the shortest possible way out, so that a leakage appears even in the rest position of the spindle. Because of the wearing, the packing must be lengthened and more often tightened. A long packing increases the friction, which deteriorates the sensitivity and accuracy of the controlling.

In a tight rotating valve like a ball or plug valve used for controlling, significant problems are caused by the frictional forces. The friction between the closure sealing and the closure member is significant for the adjustment, as the moment arm of the friction force is big. Structures that aim at minimizing this problem are disclosed in patent publications U.S. Pat. Nos. 5,305,987 and 4,822,000 where an eccentric segment is used. Another way of solving the problem is to separate the seal from the closure member either mechanically (patent publication U.S. Pat. No. 4,867,414) or by means of a pressure difference (patent publication U.S. Pat. No. 4,747,578).

An other friction source in a rotating valve is the pressure difference of the inflow and outflow sides in the controlling position. This pressure difference generates a force pushing the closure member, so that the closure member must be supported with bearings to the valve body. A friction moment against the rotating of the closure member is generated by this force, thus making it difficult to achieve exact adjustment.

A third friction source is the sealing between the valve body and the shaft of the closure member, e.g. a packing. This packing is necessary when the actuating device is arranged outside the body. Due to the friction forces of the closure sealing and the bearing, the turning shaft must be dimensioned against the torsion, so that the diameter of the packing becomes bigger than the one of a seat valve of corresponding size. The moment arm of the friction force generated by the seal forces of the shaft grows bigger.

When the turning shaft extends outside the body, an axial pressure force is generated which must be supported either with arrangements inside or outside the body. This supporting generates a friction moment.

In addition to friction moments, the rotating valves also have a significant dynamic moment that is caused by the ununiformly distributed speed increase in the flow channel of the closure member or of the body, and by the resulting pressure difference. This moment disturbs the exact controlling, because its magnitude depends on the angle of opening and it is not linear.

Still one disadvantage of the rotating valves is the noise created in connection with the controlling. A ball valve and its derivatives have a big flow capacity but one drawback is the noise created by cavitation. The cavitation bubbles collapse outside the valve in the piping near the pipe wall, from where the noise is transmitted to the neighbourhood. This noise has been decreased efficiently by arranging the pressure reduction in multiple stages (see patent publication U.S. Pat. No. 4,530,375).

Patent publication U.S. Pat. No. 4,149,563 discloses a so called silent seat-valve, where the cavitation bubbles collapse inside a liquid in an isolated space.

Patent publication U.S. Pat. No. 4,651,775 discloses a three-way valve, the closure member of which is hollow and perforated. Patent publication U.S. Pat. No. 4,778,152 discloses a plug valve, the plug of which is equipped with a transverse opening. From patent publication U.S. Pat. No. 5,219,148 there is known a valve having a plate-like closure member arranged transversely with respect to the turning shaft, and this plate has several openings.

DISCLOSURE OF INVENTION

The object of the present invention is to combine the advantages of a quarter-rotating valve and a seat valve and substantially to eliminate and decrease the drawbacks of these two valve types.

A control valve in accordance with the present invention is characterized in that the second flow channel has in the body of the valve an extension, the outer surface of which forms a surface of revolution concentric with the inner surface of the closure member, and which extends within the closure member against the inner surface of the closure member, and on the sides of which there is one or several openings; and that the opening or openings of the closure member are located so that in the open position of the valve they at least partly overlap the hole or holes of the extension of the flow channel, and in the closed position of the valve the opening or openings of the extension of the flow channel are covered by the closure member.

Preferably, the openings of the flow channel extension in case of two openings are located on the axis that goes via the center axis of the turning shaft and is perpendicular with respect to the plane that goes via the center axis of the turning shaft and the axis of the first flow channel.

Closing and opening are effected by a rotating movement without any movement parallel with the shaft, so that the impurities collected on the shaft are not conveyed to the packing area and do not cause wear of the packing. Tightening of the packings can, however, cause sticking, so that the rotating movement can cause annular wear marks. These wear grooves act, however, as multi-stage gap sealings, as the grooves are transversely with respect to the flow direction. The sum of pressure losses generated in the leakage approaches the pressure difference to be sealed, so that the leakage remains minor. The improved sealing has the effect, that the length of the packing and the share of the resulting forces remains smaller and the controlling accuracy will be better than in the case of a seat valve.

The closure sealings can be placed on the outflow side of the closing valve, so that the pressure difference across the sealings in the open position of the valve tends to loosen them from the closure member. This decreases the need for the turning moment of the closure member.

When the closure sealings and the flow openings of the closure member are situated symmetrically with respect to the turning shaft, no lateral forces are generated to the closure member and its turning shaft, that would have to be supported. Accordingly, no friction forces are generated that would increase the required turning moment.

Only a small dynamic moment disturbing the adjustment appears in the closure member, because the pressure surface area generating this moment is only the cross section of a thin cylindrical wall at the position of the flow opening. The walls of the closure member can be thin, because the forces applied to the member are symmetrical and directed only to the points where the flow openings are. On the remaining area the pressure forces are balanced.

A small turning moment does not require a big turning shaft, so that the portion of the friction caused by sealings of the turning shaft, e.g. the packings, remains small. As the need of the turning moment is minimized, a thin turning shaft can be used. This results in a small shaft packing installation with a minor leakage through it.

Further, the need of a smaller turning moment results in small actuator, the price of which is lower.

In a valve in accordance with the present invention, the cavitation bubbles collapse easily inside the valve. The flows symmetrically from the opposite directions, when colliding with each other, generate a pressure peak that makes the bubbles collapse in the central part of the valve that is isolated. For this reason the valve is silent.

The valve can also be implemented without closure sealings. Even in that case the leakage is minimized. In the closed position the clearance having influence on the leakage can be minimized, because no heat expanding margin is required. This is because the heat dissipation from the flowing medium expands the closure member more than the body inside it. As the diameter of the closure member is bigger than that of the body, the working clearance increases.

BRIEF DESCRIPTION OF DRAWINGS

The invention and its details will be described in more detail in the following, with reference to the enclosed drawings, wherein.

MODES FOR CARRYING OUT INVENTION

Figure 1:
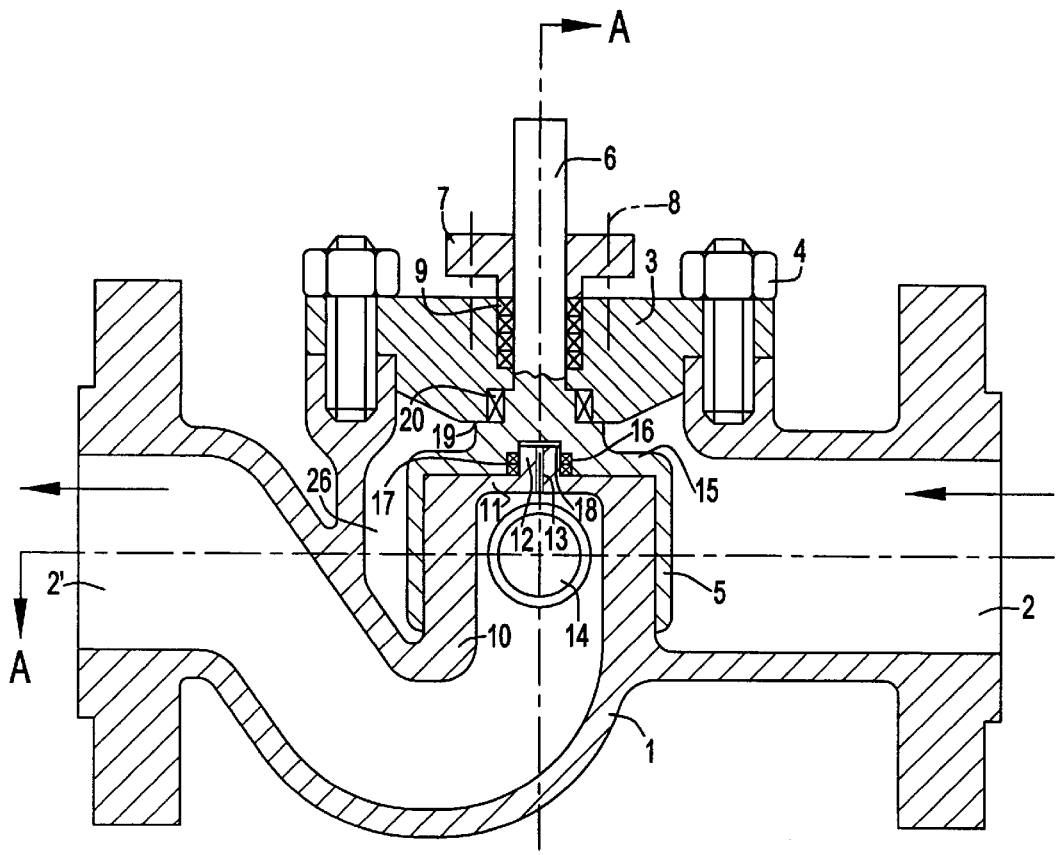
FIG. 1 illustrates as a vertical section a valve in accordance with one embodiment of the present invention, in the open position of the valve.
Figure 2:
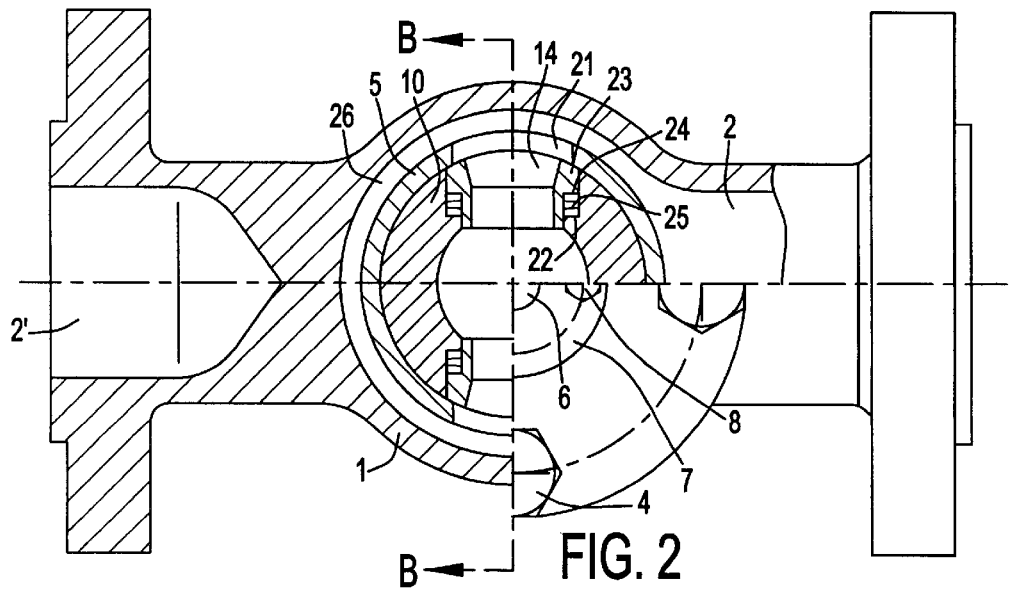
FIG. 2 illustrates the same valve viewed from top as a section along the line A—A.

In the embodiment illustrated by FIGS. from 1 to 4, a first and a second flow channel 2, 2' intended to be connected to the piping, lead to a valve body 1. The cover 3 of the body is fixed to the body with bolts 4. The turning shaft 6 of a closure member 5 extends through the cover. A tightening flange 7 of the packing of the turning shaft is fixed to the cover with bolts 8. Between the tightening flange and the cover there is a packing 9 surrounding the shaft.

The extension 10 of the second flow channel 2' extends within the body towards the turning shaft. The outer surface of the flow channel extension is a cylinder, the center axis of which unites with the center axis of the turning shaft 6. In the middle of the plate-like outer surface of the end 11 of the cylinder there is a cylindrical projecting part 12 and in the middle of it a channel 13. On the sides of the flow channel extension 10 there are two openings 14 located on the axis that goes via the center axis of the turning shaft 6 and is perpendicular with respect to the plane that goes via the center axis of the turning shaft 6 and the axis of the first flow channel 2.

The closure member 5 has a form of an upside down turned cup opening downwards and the turning shaft 6 joins the outer wall of the bottom 15 of this cup so that the shaft projects upwards from the bottom of the cup. The inner surface of the closure member 5 mainly complements the outer surface of the flow channel extension 10 and it is fitted against the outer surface of the flow channel extension. The diameter of the lower part of a cavity 16 in the inner surface of the closure member bottom 15, said cavity 16 complementing the projecting part 12 of the flow channel extension, is, however, somewhat bigger than the diameter of the projecting part 12, so that there is a packing 17 between the cavity and the projecting part. The cavity 16 is a little higher than the projecting part 12 so that a space 18 is left between the cavity and the projecting part, where the channel 13 opens to.

The lower surface of the valve cover 3 is fitted against shoulder 19 of the closure member bottom 15 so that there is a bearing 20 between the valve cover and the closure member.

On the sides of the closure member 5 there are two openings 21 that in the open position of the valve overlap the openings 14 of the flow channel extension 10. The diameter of the inner end of the openings 14 of the flow channel extension is somewhat smaller than the diameter of the outer end of the openings so that there is a shoulder 22 in the openings. Between the shoulder 22 of the opening 14 and the closure member, a sealing 23 with a shoulder 24 is fitted, said sealing surrounding the inner surface of the opening. A bellow 25 presses by means of the shoulder 24 the sealing 23 against the inner surface of the closure member 5. The openings 21 of the closure member are somewhat smaller than the openings 14 of the flow channel extension, so that in the open position on the valve, the sealing 23 is set against the edges of the opening 21 of the closure member.

Between the closure member 5 and the valve body 1, there is, surrounding the closure member, an annular passage 26 that joins the first flow channel 2.

The first flow channel 2 is the inflow side of the valve and the second flow channel 2' is the outflow side. In the open position of the valve, the openings 21 of the closure member join the openings 14 of the second flow channel extension, thus allowing the medium to flow from the first flow channel 2 through the openings to the second flow channel extension 10 and further to the second flow channel 2'. The closure member can be turned steplessly by means of the turning shaft 6, so that the openings of the closure member move partly or totally away from the openings of the flow channel extension and the openings are closed by the wall of the closure member.

In the valve in accordance with the present invention, the radial forces are balanced, when the pressure differences across the openings 21 of the closure member in the closed and controlling situation compensate each other. Thus, the moment required for turning the valve is very small.

The bearing in the axial direction of the turning shaft 6 is effected by the pressure of the inflow and outflow sides. The axial forces are balanced by leading the outflow pressure to the space 18 below the closure member. In the closed and controlling situation this pressure is always smaller than the pressure of the inflow side.

The packing 17 limits to the inner surface of the closure member an circular surface area, the center of which is the center of the turning shaft. A force is generated thereby that the pressure of the inflow side pushes the turning shaft 6 of the closure member inwards on an area which is equal to the area corresponding to the outer diameter of the closure member 5 less the cross-sectional area of the turning shaft 6 at the position of the packing 9. The force pushing the turning shaft 6 outwards is the pressure of the inflow side on the surface area that is equal to the area corresponding to the outer diameter of the closure member 5 less the cross-sectional area of the projecting part 12. If the pressure of the outflow side in the closed position is the same as the atmospheric pressure, no other axial forces appear.

When the closure member is opened, an increasing pressure of the outflow side comes through the channel 13 to the area limited by the packing 17, and when the closure member is further opened, also the pressure increases and tends to push the turning shaft 6 outwards. As a variable component force of the sum of the axial forces there is only the pressure force effective in the space 18. By suitable dimensioning of the cross-sectional area of the space 18 in the direction of the diameter of said space, the pressure forces in the axial direction can be balanced in the required controlling position of the closure member. This situation is possible, when the diameter of the projecting part 12 is bigger than the diameter of the turning shaft 6 at the position of the packing 9.

The pressure difference that is effective across the throttling point of the openings 14 of the flow channel extension generates in the controlling situation a force relieving the sealings 23, so that the sealings are loosened from the inner surface of the closure member 5.

Due to the balancing and the relieving of the forces, the friction forces effective in the valve are minor and a small actuator can be used.

The cavitation bubbles collapse within the flow channel extension 10 when colliding with each other from the opposite directions.

Figure 3:
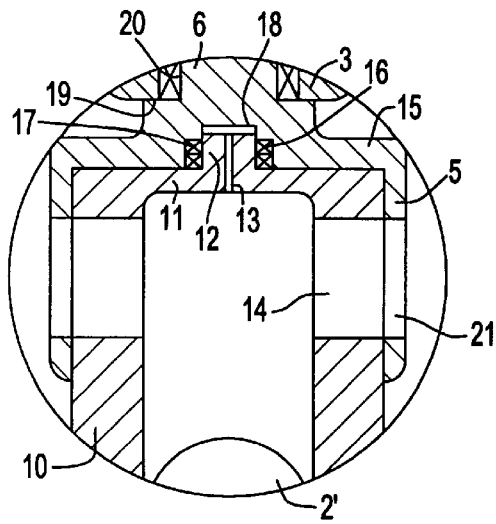
FIG. 3 illustrates as an enlarged vertical section in direction B—B a detail of a valve in accordance with a second embodiment of the present invention, in the open position of the valve.

FIG. 3 illustrates an embodiment, where there is no sealing between the flow channel extension and the closure member. The sealing is not even in closed position completely leakproof, but leaks through to some extent. For certain purposes even this kind of a structure is sufficient.

Figure 4:
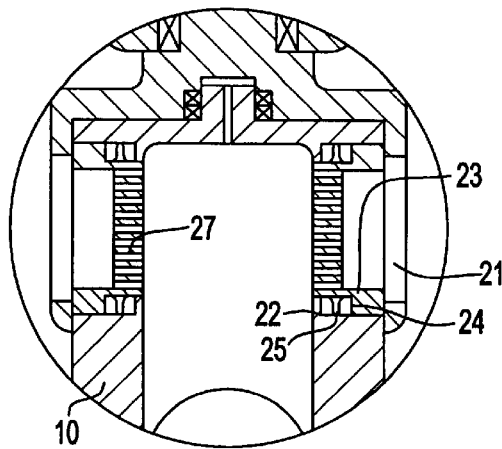
FIG. 4 illustrates as an enlarged vertical section in direction B—B a detail of a valve in accordance with a third embodiment of the present invention, in the open position of the valve.

FIG. 4 illustrates an embodiment, wherein the openings of the sealings 23 are additionally provided with attenuating elements 27 for decreasing the noise and the cavitation. The perforated attenuating elements divide the flow into several partial flows. When necessary, an attenuator can also be fitted within the flow channel extension.

Figure 5:
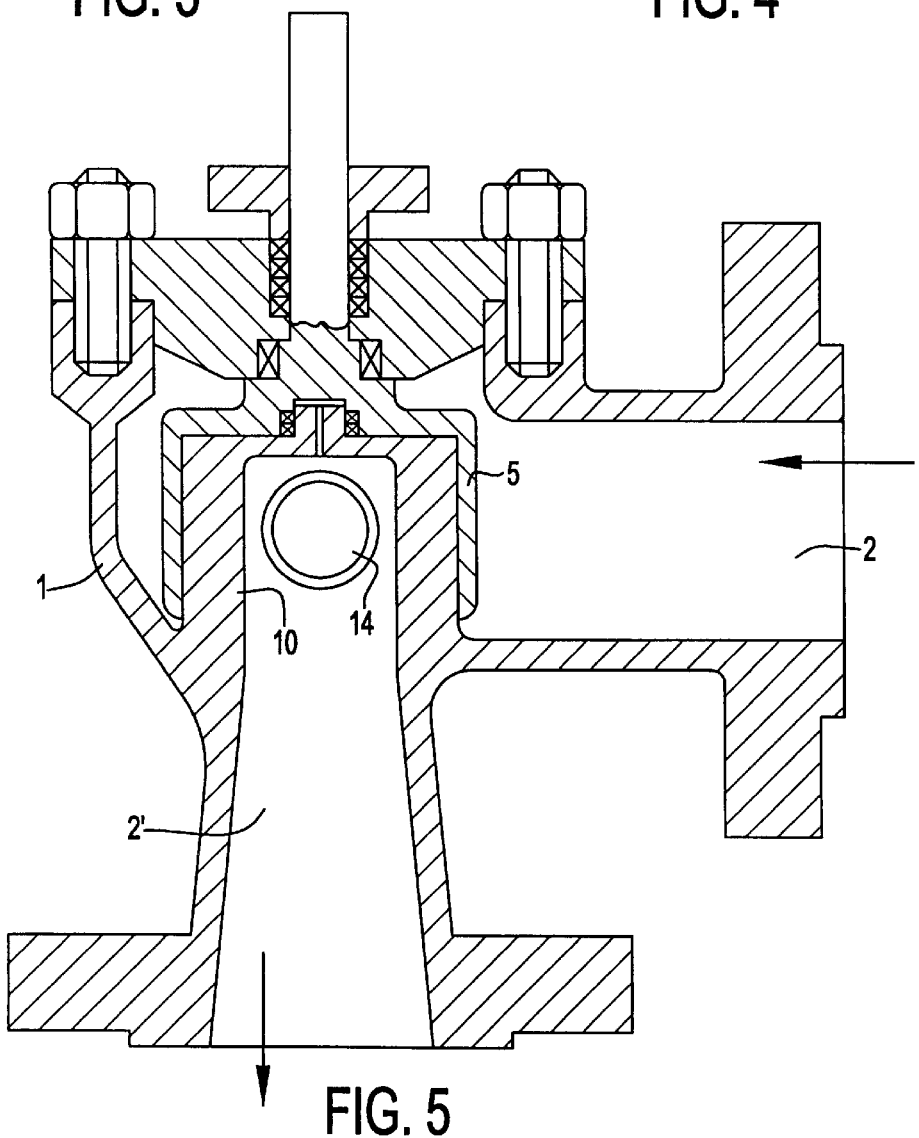
FIG. 5 illustrates as a vertical section a valve in accordance with a fourth embodiment of the present invention, in the open position of the valve.

In the embodiment of FIG. 5, the second flow channel 2' is parallel with the turning shaft of the closure member.

Figure 6:
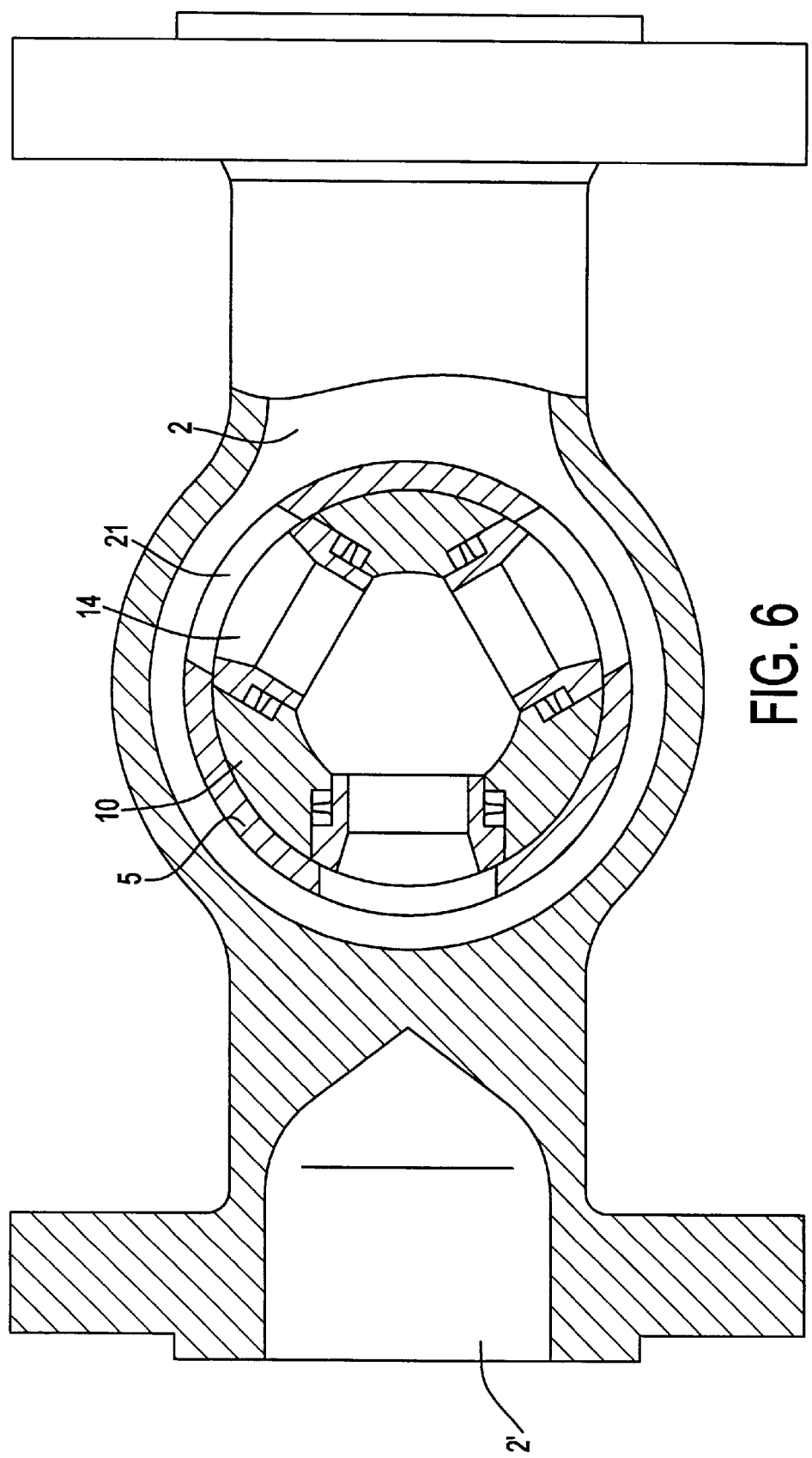
FIG. 6 illustrates as a cross section viewed from top a valve in accordance with still one embodiment.

The number of the openings of the closure member and the flow channel can also be other than two; on the periphery of the closure member there can be one of them or uniformly distributed several of them. FIG. 6 illustrates an embodiment, where the number of the openings of the closure member and the flow channel is three and they are uniformly distributed and symmetrically located with respect to the plane that goes via the center axis of the turning shaft and the first flow channel. When the number of openings is only one, a lateral force is generated. If the pressure level of the valve is not high, the disadvantage caused by the lateral force is not significant.

In the valve the flow direction can also be arranged contrary to what has been stated above, in other words, the inflow side can be the flow channel 2', with the extension 10 connected thereto. There the flow direction is from within the closure member outwards. In that case, however, the sealings located on the outflow side of the closure member do not loosen in the open position from the closure member so that the friction would be decreased.

The outer surface of the flow channel extension 10 and the inner surface of the closure member 5 fitted against each other can be besides cylindrical, also conical or e.g. in the shape of a part of a spherical surface.

The openings of the closure member and the flow channel can be designed in different ways, e.g. in the form of a drop or V-openings. By designing, the flow characteristics of the valve can be modified as required.

When a simple structure is aimed at, the balancing of the axial forces can be left out, because the significance of these forces is small with respect to the sealing forces.

I claim:

1. A control valve comprising:

a valve body including a first and a second flow channel connected with each other;

a turnable, cup-formed closure member located within the valve body; and a shaft extending outside the valve body for turning the closure member;

whereby the inner surface of the closure member is a surface of revolution, the center axis of which is the turning shaft of the closure member, and on the sides of the closure member there is at least one opening which, in the open position of the valve, is connected with the flow channels of the valve body;

in the body of the valve there is an extension of the second flow channel, the outer surface of which extension is a surface of revolution concentric with the inner surface of the closure member, and which extend within the closure member against the inner surface of the closure member, and on the sides of which there is at least one opening; and the at least one opening of the closure member is located so that in the open position of the valve it at least partly overlaps the at least one opening of the extension of the flow channel, and in the closed position of the valve the at least one opening of the extension of the flow channel is covered by the closure member, wherein an edge of each at least one opening of the flow channel extension is provided with a seal fitted against the closure member.

2. A control valve in accordance with claim 1, wherein the seal fitted against the closure member is located on the downstream side of the closure member.

3. A control valve in accordance with claim 1 or 2, wherein at the end of the flow channel extension there is a channel that joins an area in the middle of the inner surface of the closure member, said area being separated from the rest of the area of the inner surface of the closure member with a packing.

4. A control valve in accordance with claim 3, wherein the number of the openings of the flow channel extension corresponds to the number of the openings of the closure member.

5. A control valve in accordance with claim 4, the flow channel of which has at least two openings, wherein the openings of the flow channel extension are located symmetrically with respect to the turning shaft of the closure member.

6. A control valve in accordance with claim 5, wherein the openings of the flow channel extension are located on the axis that goes via the center axis of the turning shaft and is perpendicular with respect to a plane that goes via the center axis of the turning shaft and an axis of the first flow channel.

7. A control valve in accordance with claim 6, wherein the inner surface of the closure member and the outer surface of the flow channel extension have at least one of a cylindrical and a conical shape.

8. A control valve in accordance claim 1, wherein the number of the openings of the flow channel extension corresponds to the number of the openings of the closure member.

9. A control valve in accordance claim 2, wherein the number of the openings of the flow channel extension corresponds to the number of the openings of the closure member.

10. A control valve in accordance with claim 1, the flow channel of which has at least two openings, wherein the openings of the flow channel extension are located symmetrically with respect to the turning shaft of the closure member.

11. A control valve in accordance with claim 2, the flow channel of which has at least two openings, wherein the openings of the flow channel extension are located symmetrically with respect to the turning shaft of the closure member.

12. A control valve in accordance with claim 3, the flow channel of which has at least two openings, wherein the openings of the flow channel extension are located symmetrically with respect to the turning shaft of the closure member.

13. A control valve in accordance with claim 12, wherein the inner surface of the closure member and the outer surface of the flow channel extension have at least one of a cylindrical and a conical shape.

14. A control valve in accordance with claim 1, wherein the inner surface of the closure member and the outer surface of the flow channel extension have at least one of a cylindrical and a conical shape.

15. A control valve in accordance with claim 2, wherein the inner surface of the closure member and the outer surface of the flow channel extension have at least one of a cylindrical and a conical shape.

16. A control valve in accordance with claim 3, wherein the inner surface of the closure rememberr and the outer surface of the flow channel extension have at least one of a cylindrical and a conical shape.

17. A control valve in accordance with claim 4, wherein the inner surface of the closure member and the outer surface of the flow channel extension have at least one of a cylindrical and a conical shape.

18. A control valve in accordance with claim 5, wherein the inner surface of the closure member and the outer surface of the flow channel extension have at least one of a cylindrical and a conical shape.

* * * * *